United States Patent
Plona

(10) Patent No.: US 8,011,666 B2
(45) Date of Patent: Sep. 6, 2011

(54) DYNAMIC BRUSH SEAL

(75) Inventor: Daniel Georges Plona, Vulaines/Seine (FR)

(73) Assignee: Snecma, Paris (FR)

( * ) Notice: Subject to any disclaimer, the term of this patent is extended or adjusted under 35 U.S.C. 154(b) by 554 days.

(21) Appl. No.: 12/163,034

(22) Filed: Jun. 27, 2008

(65) Prior Publication Data

US 2009/0001668 A1  Jan. 1, 2009

(30) Foreign Application Priority Data

Jun. 29, 2007 (FR) ...................................... 07 56153

(51) Int. Cl.
*F16J 15/44* (2006.01)
(52) U.S. Cl. ...................................................... 277/355
(58) Field of Classification Search ................... 277/355
See application file for complete search history.

(56) References Cited

U.S. PATENT DOCUMENTS

| 5,400,586 | A |   | 3/1995 | Bagepalli et al. |         |
|-----------|---|---|--------|------------------|---------|
| 5,423,557 | A | * | 6/1995 | De Villepoix et al. | 277/554 |
| 5,752,805 | A | * | 5/1998 | Gail et al.      | 415/229 |
| 5,794,938 | A | * | 8/1998 | Hofner et al.    | 277/355 |
| 5,944,320 | A | * | 8/1999 | Werner et al.    | 277/355 |
| 6,077,038 | A | * | 6/2000 | Gail et al.      | 415/229 |
| 2007/0187900 | A1 | * | 8/2007 | Datta         | 277/355 |

FOREIGN PATENT DOCUMENTS

| DE | 39 07 614 A1 |   | 9/1990 |
|----|--------------|---|--------|
| EP | 0 576 316 A1 |   | 12/1993 |
| EP | 617216 A1    | * | 9/1994 |
| EP | 1 517 006    |   | 3/2005 |
| EP | 1 559 873 A2 |   | 8/2005 |
| GB | 2 250 790 A  |   | 6/1992 |
| GB | 2 291 939 A  |   | 2/1996 |

\* cited by examiner

*Primary Examiner* — Thomas Beach
*Assistant Examiner* — Gilbert Lee
(74) *Attorney, Agent, or Firm* — Oblon, Spivak, McClelland, Maier & Neustadt, L.L.P.

(57) ABSTRACT

A seal capable of providing a seal for an air gap between a rotor and a stator. The seal incorporates a container for the textile insulators fixed on the rotor or the stator. The textile insulators are subjected, on one side, to an upstream pressure and, on another side, to downstream pressure, the upstream pressure being greater than the downstream pressure. The textile insulators are supported on the stator or the rotor so as to be at an angle to the side of the seal where the pressure is lower, namely the downstream pressure.

14 Claims, 3 Drawing Sheets

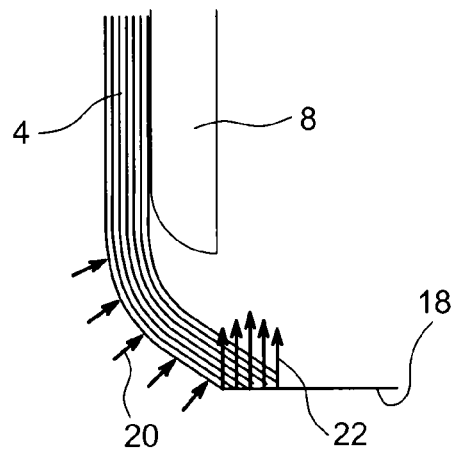
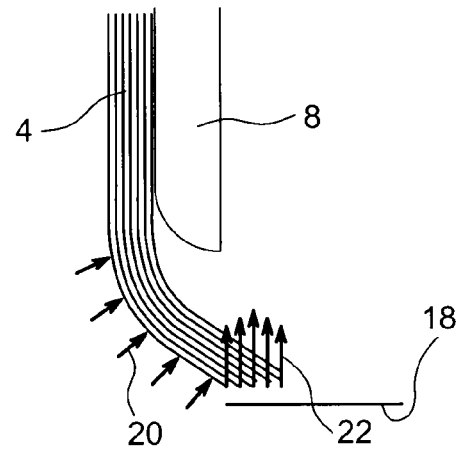
FIG. 3A　　　　　FIG. 3B
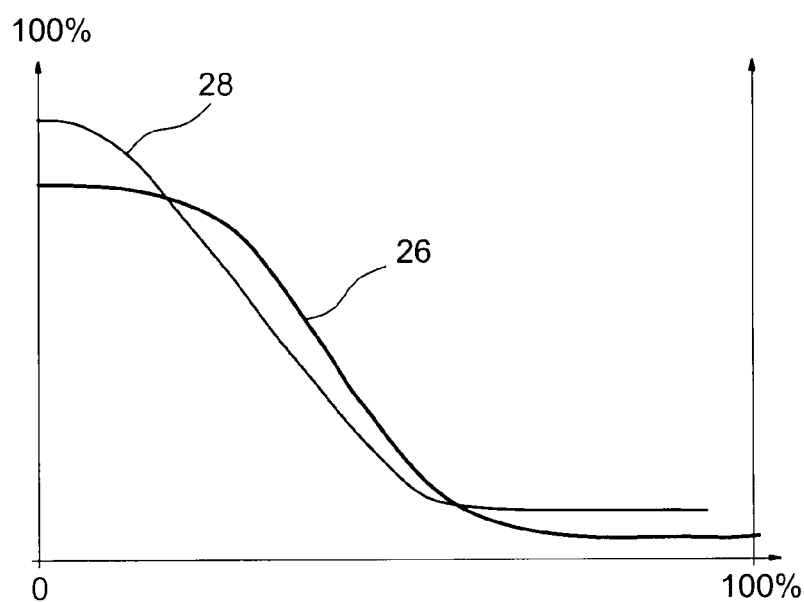
FIG. 4

DYNAMIC BRUSH SEAL

BACKGROUND OF THE INVENTION

I. Field of the Invention

The invention relates to a seal with a dynamic brush to provide a seal between a rotor and a stator.

Seals with brushes of this type are used in the main to produce a seal between a compartment containing air and a compartment containing a mixture of air and oil or a seal between two compartments containing air in high and low pressure compressors and in high and low pressure turbines.

More precisely, the invention relates to a seal with brush consisting of non-metallic textile insulators, capable of providing a seal for an air gap between a rotor and a stator incorporating a container for the textile insulators fixed on to the rotor or the stator, the textile insulators being subjected, on one side, to an upstream pressure and on another side to a downstream pressure, the upstream pressure being greater than the downstream pressure.

II. Description of Related Art

The seals currently used in these applications are seals of the labyrinth type which incorporate annular teeth called tongues. When inserted in a ring, in softer material called abradable, these tongues produce a plurality of cross-section restrictions generating a loss of charge and thus a reduction of output. With such a seal, permeability in air is high and accordingly the turbomachine consumes oil, which leads to costs and is also toxic for the environment.

We are also familiar (EP 1 517 006) with a seal with a brush which provides sealing of the cavity for sampling air at the cabin. This cavity is delineated first by an external shell of the compressor and an annular structure connected to the shell and second by the external housing of the diffuser grid, an abutment connected to the external housing and an external shell of the motor housing. The seal incorporates textile insulators which extend radially towards the outside and which are supported on the inner surface of a cylindrical seal forming an integral part of the annular structure and surrounding the seal with a brush. However, a seal of this type produces a static seal in which there are no problems with wear.

We are also familiar (U.S. Pat. No. 5,400,586) with a seal with a self-adjusting brush for a gas turbine combustion chamber. The gas turbine incorporates a combustion chamber incorporating at its output end a transition part spaced from a first stage pipe. A seal with a brush provides a seal between the transition part and the first stage pipe. The seal incorporates a sealing shell supported either by the transition part or by the first stage pipe. A gasket incorporates textile insulators which come into contact with the sealing shell to make the space included between the transition part and the first stage pipe leakproof. A seal of this type also produces a static seal and there are no problems with wear.

We are again familiar with seals with a metallic brush which have been used with turbomachine applications since the fifties. The most important point to note about this technology is the need to butt the hairs against a barrier resistant to pressure (the rear ring). The consequence is a stiffening of the brushes proportional to the applied pressure, which can cause accelerated wear of the brushes if the gap ceases to exist under these conditions. The least contact with the rotor leads to rapid wear of the seal and deterioration of the sealing properties.

BRIEF SUMMARY OF THE INVENTION

The object of this invention is a seal with a dynamic brush which overcomes the disadvantages of the prior art. These aims are achieved according to the invention by the fact that the textile insulators are supported on the stator or the rotor such that they are at an angle to the side of the seal where the pressure is lowest, i.e. the downstream pressure.

Owing to this characteristic, the elasticity of the textile insulators which provide a contact pressure on the rotor or the stator is counterbalanced by the aerodynamic force which lifts the textile insulators from their seating, which has the effect of minimising the contact pressure on the rotor or the stator. In this way, the wear of the seal is rendered as low as possible.

At cruising speed, there is a slight gap, across which there is a thin flow of air, but the oil contained in the air-oil mixture (air with an oil misting) is kept downstream of the seal such that oil leaks are avoided completely.

The textile insulators are angled in the direction of the outlet at an angle $\alpha$ between 5° and 45° inclusive, and more preferably between 10° and 30°.

In one particular embodiment, the container incorporates an internal envelope on which the textile insulators are wound and an external envelope which surrounds the textile insulators.

Advantageously, the seal with a brush incorporates an upstream ring and a downstream ring placed between the external envelope and the textile insulators.

Advantageously, the internal envelope and the external envelope form a C-shape.

In a preferred embodiment, the seal with brush incorporates a helical spring placed at the centre of the internal envelope; any type of elastic ring can also provide this function.

In one particular embodiment, the downstream ring incorporates a chamfer.

More preferably, the seal with brush is mounted on a support, said support incorporating a housing in which the container is accommodated and a stop ring to immobilise the container in its housing.

In one particular embodiment, the downstream ring is shorter than the support and the support has a shelf on which the textile insulators are supported to assume a dished shape.

More preferably, the stop ring crushes the container so as to provide, by the distortion of the container, a static seal between the container and container's housing.

The invention also relates to a turbine or a turbomachine compressor incorporating a seal with brush according to the invention.

Finally, the invention relates to a turbomachine incorporating a turbine and/or a compressor equipped with a seal with brush according to the invention.

BRIEF DESCRIPTION OF THE DRAWINGS

Other characteristics and advantages of the invention will appear again on reading the description which follows of specimen embodiments given for illustration by reference to the appended figures. On these figures:

FIG. 3A is a detail view which shows the contact pressure of the brushes on the rotor;

FIG. 3B is a detail view which shows the brushes peeling away from the rotor;

FIG. 4 is a curve which depicts the rate of wear according to the pressure of the brushes on the rotor;

DETAILED DESCRIPTION OF THE INVENTION

Figure 1:
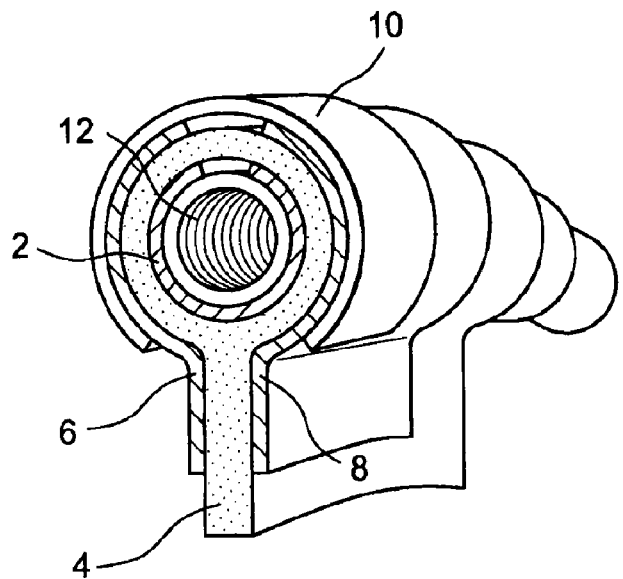
FIG. 1 represents an isometric view of a seal with brush according to this invention.

In FIG. 1, the seal with brush incorporates an internal envelope 2 in the form of a C facing upwards. The textile insulators 4 forming the brush are wound on this internal envelope. The textile insulators are held by an upstream ring 6 and a downstream ring 8. The upstream ring 6 and the downstream ring 8 are held in place by an external envelope 10 having a C shape facing downwards. In addition, a helical spring 12 is present inside the internal envelope 2. This latter is supported on the helical spring 12. The angle $\alpha$ is between 5° and 45° inclusive, and more preferably between 10° and 30°.

The brush 4 is made from carbon hairs with a diameter of approximately 6 μm. The thickness of the layer varies between one millimeter and 4 millimetere according to the applications.

Figure 2:
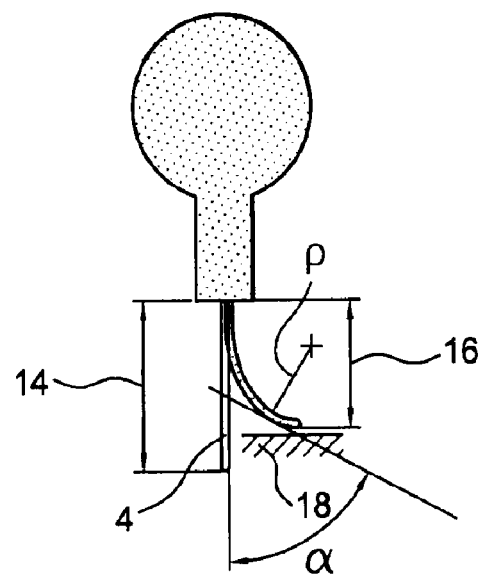
FIG. 2 represents a sectional view which illustrates the curvature of the brush.

The mounting of the seal is illustrated in FIG. 2. The reference 14 denotes the free length of the hairs 4, whereas the reference 16 represents the height under the rear ring of the dished hairs 4 supported on the rotor 18. The angle of the hairs relative to a plane perpendicular to the surface of the rotor 18 is denoted by $\alpha$. The radius of curvature of the hairs at their dished end is denoted by the letter p. The internal envelope 2, the external envelope 10 and the upstream and downstream rings 6, 8 form a container. In FIG. 3A, the hairs 4 are supported on the rotor 18. The hairs are subject to an upstream pressure and a downstream pressure, the difference in which forms a differential pressure 20. The hairs 4 exert a contact pressure 22 on the rotor 18. This contact pressure 22 is reduced by the differential pressure 20 which tends to lift the hairs from the rotor 18. Unlike seals with a metallic brush, the invention does not seek to counter the pressure by abutting the hairs against the rear ring. The gap at the rear ring is even dimensioned so that the layer could migrate between the rotor and the former.

As depicted in FIG. 3B, the hairs can be raised from their support on the rotor 18. There is therefore a slight gap between the end of the hairs and the rotor 18 and a leakage flow is produced in this gap. This invention allows this leakage to be managed.

On mounting, there is deflection of the brushes under the rear ring 8. The aerodynamic forces are exerted freely on the layer and can lift this from the rotor at high differential pressures. The permeability characteristic is degraded significantly above 2.5 bars, but wear is achieved which reduces gradually with the pressurisation. The stiffness of the brush is matched to the sealing pressure so as to minimise during operation at cruising speed the contact pressure and therefore wear of the seal.

A curve which illustrates the variation of the rate of wear 26 according to the pressure of the brushes on the rotor 28 is represented in FIG. 4. As will be noted, the rate of wear appreciably follows the pressure of the brushes on the rotor. For a pressure of the brushes equal to 100%, the rate of wear is maximum, with the rate of wear then decreasing with the pressure of the brushes on the rotor to achieve a minimum value when the pressure of the brushes on the rotor is at its minimum.

In summary, the brushes are effective only at low pressure. The operation most harmful for the working life of the rotor/stator contact is slowing down. The low slipping speed under these conditions guarantees a reduced rate of wear for a number of applications.

Figure 5:
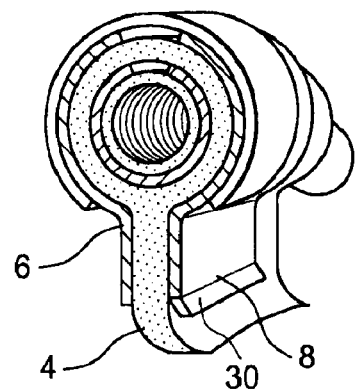
FIG. 5 is a variation of the gasket depicted in FIG. 1 incorporating a brake field on the rear ring.

FIG. 5 represents an embodiment variation in which the downstream ring 8 incorporates a chamfer 30. The function of this chamfer is to facilitate the inclination of the brushes 4 and to reduce shearing of the textile insulators. It will also be noted on FIG. 5 that the hairs are not the same length. This stems particularly from the fact that the end of the hairs has been represented in a pointed manner on FIG. 5.

Figure 6:
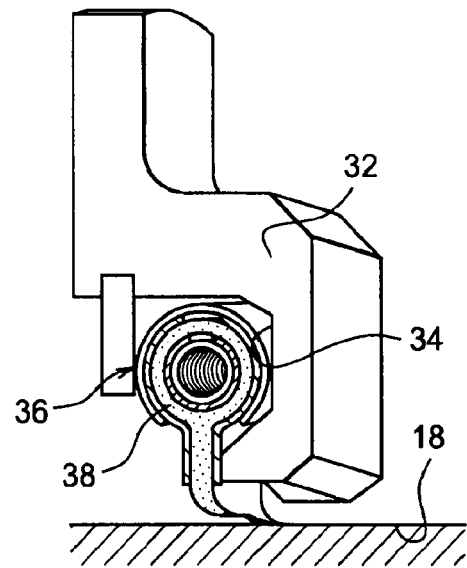
FIG. 6 is an isometric view which shows the seal mounted in its housing.

FIG. 6 illustrates the manner in which the container of the gasket is mounted on a support 32. The support incorporates a housing 34 in which the container is accommodated. A stop 36 immobilises the container in the housing 34. According to one characteristic of the invention, the stop 36 is placed so as to crush the container slightly so as to give it an oval shape and apply its upper part 38 against the surface of the housing 34 so as to produce a static seal between the container and the housing.

Figure 7:
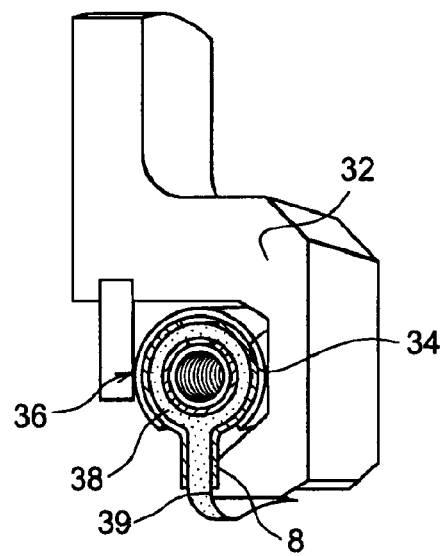
FIG. 7 is a variation in which the seal incorporates a short rear ring and in which the housing incorporates a shelf to support the textile insulators.

An embodiment variation in which the downstream ring 8 has been shortened is represented in FIG. 7. The housing 32 incorporates a curved surface 39 on which the hairs 4 are supported. The function of the curved surface 39 is therefore similar to that of the chamfer 30 for the embodiment represented on FIG. 5. Its purpose is to facilitate the inclination of the free end of the hairs.

The invention claimed is:

1. A seal with a brush, comprising:
   non-metallic textile insulators, capable of providing a seal for an air gap between a rotor and a stator;
   a container containing the textile insulators, the container being fixable on the rotor or on the stator and the container including
   an internal envelope on which the textile insulators are wound and an external envelope which surrounds the textile insulators, distal ends of the textile insulators being extended radially outward toward the rotor or the stator,
   an upstream ring and a downstream ring placed between the external envelope and the textile insulators, the upstream ring and the downstream ring including an arcuate portion to surround the textile insulators wound on the internal envelope, and
   an opening from which the distal ends of the textile insulators protrude, the textile insulators being subjectable, on one side, to an upstream pressure, and on another side, to a downstream pressure, the upstream pressure being greater than the downstream pressure, and the distal ends of the textile insulators configured to bend at an angle to the downstream side of the seal where the pressure is lower when the ends are supported on the stator or on the rotor.

2. The seal with a brush according to claim 1, wherein the distal ends of the textile insulators are configured to bend in the direction of a flow of air at an inclined angle $\alpha$ between 5° and 45° inclusive.

3. The seal with a brush according to claim 1, wherein the internal envelope and the external envelope have a C shape.

4. The seal with a brush according to claim 3, further comprising a helical spring placed at the center of the internal envelope.

5. The seal with a brush according to claim 1, wherein the downstream ring includes a chamfer.

6. A turbine or turbomachine compressor, comprising a seal with brush according to claim 1.

7. The seal with a brush according to claim 1, wherein the distal ends of the textile insulators are configured to bend in the direction of a flow of air at an inclined angle α between 10° and 30° inclusive.

8. The seal with a brush according to claim 1, wherein the distal ends of the textile insulators are configured to bend along a radius to form a dished shape.

9. The seal with a brush according to claim 1, wherein the upstream ring and the downstream ring define an opening between a tip of the arcuate portion of the upstream ring and a tip of the arcuate portion of the downstream ring.

10. The seal with a brush according to claim 9, wherein the seal is mounted on a support, the support including a housing in which the container and a stop are accommodated to immobilise the container in the housing.

11. The seal with a brush according to claim 10, wherein the downstream ring is shorter than the support and the support has a shelf on which the distal ends of the textile insulators are supported to assume a dished shape.

12. The seal with a brush according to claim 10, wherein the stop crushes the container to provide, by a distortion of the container, a static seal between the container and the housing of the container.

13. The seal with a brush according to claim 9, wherein the internal envelope is cylindrically-shaped and includes an opening positioned to coincide with the opening defined by the upstream ring and the downstream ring.

14. A turbomachine, further comprising a turbine and/or a compressor according to claim 6.

* * * * *